United States Patent

[11] 3,598,163

| [72] | Inventors | Gerald W. Urschel<br>1614 Napoleon;<br>Joe R. Urschel, 202 Michigan Ave., both of<br>Valparaiso, Ind. 46383 |
|---|---|---|
| [21] | Appl. No. | 735,235 |
| [22] | Filed | June 7, 1968 |
| [45] | Patented | Aug. 10, 1971 |

[54] MACHINE FOR CUTTING A PRODUCT INTO PIECES
6 Claims, 10 Drawing Figs.

[52] U.S. Cl. .................................................. 146/78,
83/328, 83/408
[51] Int. Cl. .................................................. A23n 15/00
[50] Field of Search .......................................... 146/78,
78.1; 83/327, 328, 408

[56] References Cited
UNITED STATES PATENTS

| 196,674 | 10/1877 | Kieser | 146/78 |
|---|---|---|---|
| 2,187,252 | 1/1940 | Urschel | 146/78.1 |
| 2,934,117 | 4/1960 | Urschel et al. | 146/78.1 |
| 3,217,988 | 11/1965 | Lightfoot et al. | 146/78 X |

*Primary Examiner*—Andrew R. Juhasz
*Assistant Examiner*—Z. R. Bilinsky
*Attorney*—Charles S. Penfold

ABSTRACT: The invention involves locating inclined guide means between a conveyor and a rotatable knife assembly whereby to facilitate efficient cutting of a product into pieces.

PATENTED AUG 10 1971
3,598,163
SHEET 1 OF 2
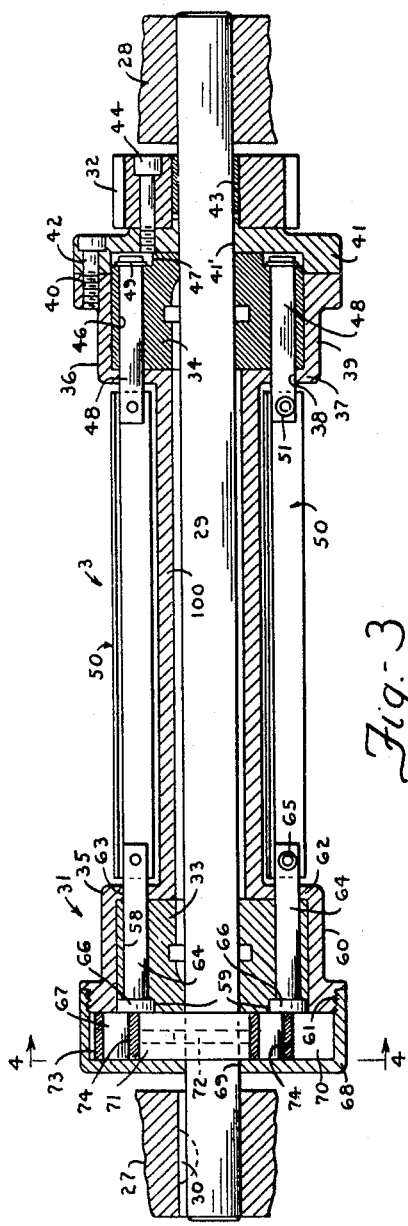
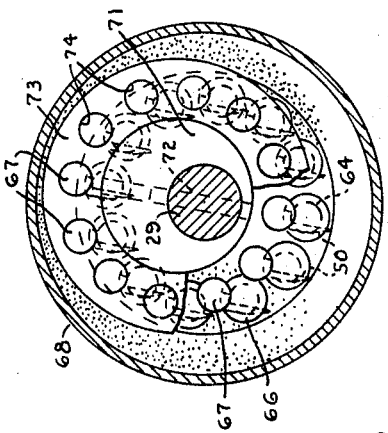
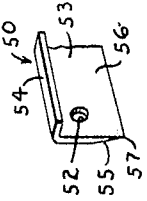
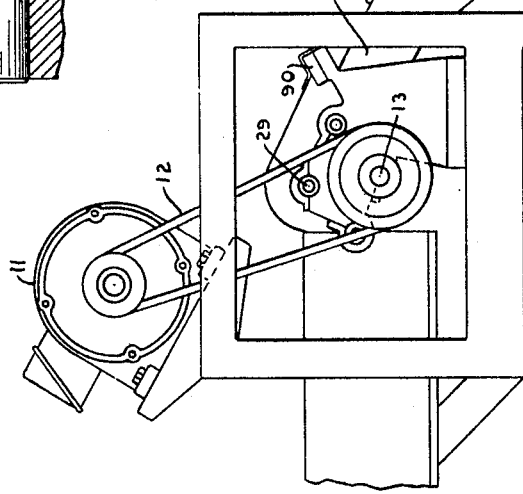
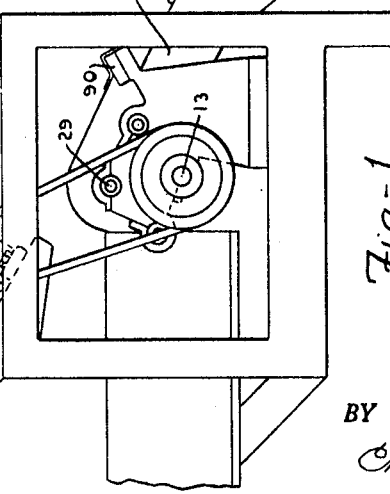
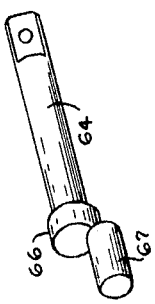
INVENTOR.
GERALD W. URSCHEL
BY  JOE R. URSCHEL
Charles S. Penfold
ATTORNEY

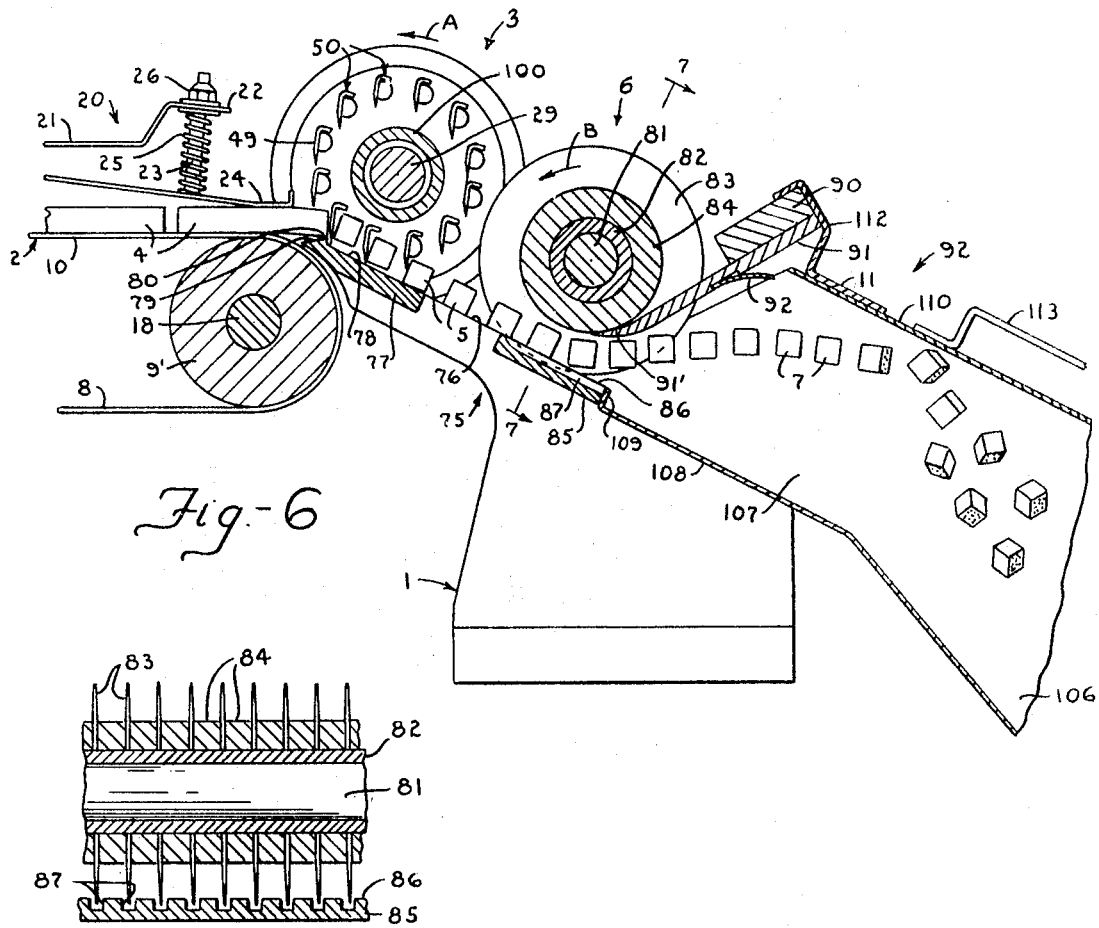
Fig.-6
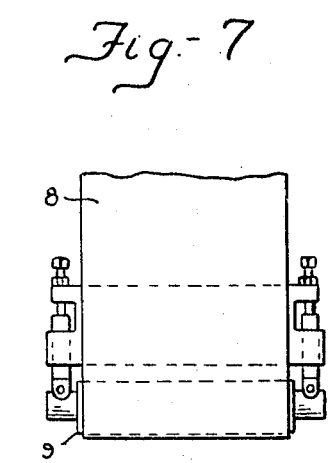
Fig.-7
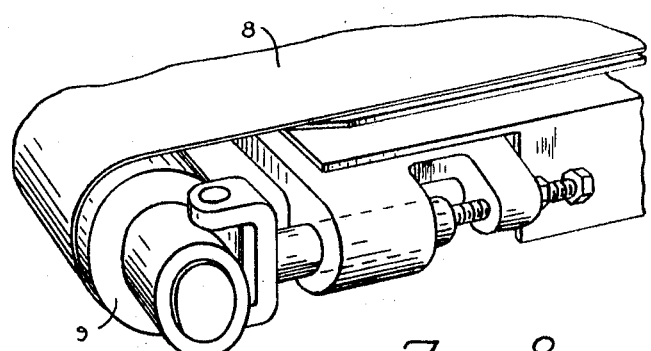
Fig.-8
Fig.-9
INVENTOR.
GERALD W. URSCHEL
BY   JOE R. URSCHEL
Charles S. Penfold
ATTORNEY

MACHINE FOR CUTTING A PRODUCT INTO PIECES

The invention relates generally to food-processing equipment and more particularly is directed to a machine for successively cutting a product into segments and cubes.

One of the important objects of the subject invention is to provide a machine which comprises, among other things, a rotatable knife assembly, a conveyor for feeding a product to the assembly for cutting it into segments, and inclined guide means which has an upper portion interposed between the conveyor and the assembly whereby to momentarily support the product while it is being cut into segments and effecting their prompt release for travel downwardly on the guide means. The particular operative relationship between the conveyor, guide means and the rotatable knife assembly has proven very practical and efficient in cutting a great variety or kinds of food products, irrespective of whether their textures are soft, medium or hard.

A significant object of the invention is to provide a machine in which a rotatable knife unit is operatively associated with the rotatable knife assembly and the guide means for cutting the segments into cubes.

Another object of the invention is to locate the guide means in an oblique angular relationship to the conveyor and substantially tangent to the knife assembly and knife unit.

A specific object of the invention is to provide a setup in which the upper portion of the guide means, above referred to, comprises an inclined surface, the plane of which if extended would pass between the longitudinal axes of the knife assembly and knife unit, and such surface terminates at a relatively high point between the conveyor and knife assembly, more or less at the breakoff area of the product, where it is cut or severed into segments by the knife assembly for travel downwardly on the guide means.

The machine is unique and believed to be the first which will completely sever the fibers of soft fibrous products of flat shapes into segments, strips or pieces without crushing the products. The machine has proven to be particularly exceptionally efficient in cutting a variety of products, such as, for example, sliced pineapple, cooked chicken and the dicing of onions, without rupturing their cell structure.

Additional objects and advantages of the invention reside in providing a machine which offers advantages with respect to design and construction, output, efficient cutting of the product without crushing thereof, and uniformity in the resultant product.

Other objects and advantages of the invention will become apparent after the description hereinafter set forth is considered in conjunction with the drawings annexed hereto.

In the drawings

FIG. 1 is an elevational view of a portion of one side of the machine embodying one or more of our inventions;

FIG. 2 is an elevational view of a portion of an opposite side of the machine;

FIG. 3 is a longitudinal sectional view of a rotatable knife assembly of the machine;

FIG. 4 is a transverse section taken substantially on line 4-4 of FIG. 3;

FIG. 4a is a partial perspective view of one of a plurality of knives constituting components of the assembly illustrated in FIG. 3;

FIG. 4a is a partial perspective view of one of a plurality of knives constituting components of the assembly illustrated in FIG. 3;

FIG. 5 is a perspective view of one of a plurality of knife holders or supporting elements utilized as components of the assembly illustrated in FIG. 3;

FIG. 6 is a vertical section taken through a portion of the machine for the purpose of exemplifying the relationship of the movable components thereof;

FIG. 7 is a transverse section taken substantially on line 7-7 of FIG. 6 of a rotatable knife unit operatively associated with the rotatable knife assembly;

FIG. 8 is a partial perspective view of a belt tightening means which may be utilized in conjunction with a conveyor means of the machine; and FIG. 9 is a partial plan view of the conveyor means.

Referring first and generally to the structure exemplified in FIGS. 1, 2, and 6 of the drawing there is shown a conveyor means generally designated 1 for feeding a product, such as pineapple slices 2, to a rotatable knife assembly generally designated 3 for cutting the product into strips or segments 5, and a rotatable knife unit generally designated 6 which is operatively associated with the assembly 3 in a unique manner for cutting the segments into cubes or pieces 7.

The conveyor means generally designated 2, as exemplified in FIGS. 6, 8, and 9, preferably includes an endless belt 8 mounted on an idling roller 9 and a driven roller 9' whereby to continuously present an upper horizontal portion of area 10 of the belt for feeding the product to the knife assembly 3. As shown in FIGS. 1 and 2, the roller 9' is preferably driven by an electric motor 11 through the agency of a belt and chain mechanism. More specifically, a pulley on the driven shaft of the motor is operatively connected by a belt 12 to a pulley on a shaft 13. The shaft 13 carries a gear 14 and a sprocket 15, the latter of which is connected by a chain 16 to a sprocket 17 fixed on a shaft 18 which carries the roller 9'. The gear 14 and its operative connection to the knife assembly 3 and knife unit 6 will be described subsequently.

If desired, a belt-tightening device of the character illustrated in FIG. 8 and 9 may be utilized in a manner whereby to maintain the upper portion 10 of the belt 8 in a relatively taut condition.

A stabilizer assembly generally designated 20 is preferably mounted above the right extremity of the conveyor means as depicted in FIG. 6 and includes an overhead support 21 having an apertured offset 22, with a threaded member 23 extending therethrough. A lower end of the member 23 is secured to an inner extremity of a movable presser shoe or pad 24. The outer ends of the support 21 and the shoe may be secured to a common mounting supported from the frame. A helical spring 25 surrounds the member 23 and is interposed between the offset 22 of the support and the shoe 24 for normally urging the support and shoe apart. A nut 26 is carried by the member 23 and may be adjusted in bearing relationship with the offset 22 whereby to assist in locating the shoe in a predetermined spaced relationship to the upper portion 10 of the belt 8. More specifically, the shoe 24 is supported in a predetermined position so that it will resiliently lightly bear against the sliced product 4 whereby to stabilize each slice while it is being cut into the segments 5 by knives of the assembly 3.

The structure of the rotatable knife assembly 3 exemplified in FIGS. 3, 4, 4a, 5, and 6 will now be described. This assembly preferably comprises a pair of stationary supports 27 and 28 and a stationary shaft 29, the latter of which has ends mounted on the supports. One of the ends of the shaft is fixedly secured to the support 27 by a key 30. The supports and shaft assist in mounting the assembly 3 in a correct operative relationship to the conveyor means 2 and the knife unit 6.

The assembly 3 also includes a unit generally designated 31 which is mounted on the stationary shaft 29 for rotation through the agency of a pinion gear 32 which is operated by means of a drive gear and a power source (not shown). This rotatable unit includes a pair of bearing blocks 33 and 34 which are respectively substantially housed in a pair of cylindrical enlargements or receiving means 35 and 36 formed integrally at the ends of a support or spoollike tubular member 100 through which the shaft 29 extends. The right enlargement 36 has a radial wall 37 provided with a plurality of circumferentially spaced apertures 38 and a cylindrical wall 39 having a thickened portion provided with a ring of spaced threaded apertures 40. A recessed cap 41 is secured to the enlargement 36 by a plurality of screws 42 which extend through the cap and connect with the threaded apertures 40. This cap is provided with a center aperture 41' through which the shaft 29 extends. The pinion gear 32 is mounted on a bushing 43 carried by the shaft and is connected to the cap by a plurality of screws 44 (one shown). The block 34 is provided with a plurality of circumferentially spaced axially extending cylindrical openings 46 and with an annular recess 47 in its outer face.

A plurality or set of cylindrical elements or holders 48 are journaled in the openings 46 in the bearing block 34 and extend through the apertures 38 in the radial wall 37 of the enlargement 36. Outer ends of the elements extend into the annular recess 47 and are held therein by resilient split rings 49 which engage cylindrical grooves in said ends. Inner exposed ends of the elements are preferably notched to provide planar seats for elongated knives generally designated 50 and with threaded apertures. Screw 51 (one shown) extend through apertures 52 provided in the knives and connect with the threaded apertures in the elements for detachably and firmly securing the right ends of the knives to the elements.

Referring more specifically to the knife structure, as shown in FIG. 4a, each knife preferably comprises a blade portion 53 and an offset 54 which is preferably disposed in an acute angular relationship to the blade portion. One side of the blade portion is bevelled to provide a planar surface 55 which converges toward an opposite planar surface 56 to define a tapered cutting edge 57.

The means employed for supporting the opposite ends of the knives 50 will now be described. As stated above, the bearing block 33 is housed in the enlargement 35 of the tubular member 100. This block is provided with a plurality of circumferentially spaced axially extending openings 58 and the outer face of this block is preferably provided with a plurality of annular recesses 59. The block 33 is rotatably mounted on the stationary shaft 29. The enlargement 35 includes a cylindrical wall 60 which is thickened and provided with external threads 61 and with a radial wall 62 provided with a plurality of circumferentially spaced apertures 63. A plurality or set of cylindrical elements or holders 64 are journaled in the openings 58 and extend through the apertures 63 in the radial wall so that inner exposed extremities of the elements may be detachably connected to the opposite extremities of the knives 50 by screws 65 which extend through the apertures 52 in the knives and threadedly connect with apertures provided therefor in the elements 64. The inner exposed extremities of the elements are also notched to provide planar seats for the knives. It will be observed that the axes of all of the cylindrical elements 48 and 64 and the knives 50 are axially aligned and are disposed in spaced parallel relationship as well as in external concentric spaced relationship with respect to the tubular member 100.

Each of the elements 64 as depicted in FIGS. 3, 4 and 5 is also preferably provided with an integral circular head 66 having an integral cylindrical crank pin 67. The crank pin 67 is disposed in an eccentric and parallel relationship to the longitudinal axis of the element 64. The heads 66 are respectively disposed in the annular recesses 59 in the bearing block 33 and serve to limit movement of the elements toward the right as shown in FIG. 3.

A unique organization or setup is provided for imparting rotation to the knives 50 and the elements 48 and 64 about their respective axes while they are revolved about the longitudinal axis of the stationary shaft 29. The means employed for obtaining this motion will now be described. An internally threaded cap 68 is connected to the threads 61 on the enlargement 35 and provided with a central aperture 69 through which the stationary shaft extends. The enlargement 35, cap 68 and block 33 in combination define an annular space 70. Confined within this space is a hub member 71 which is preferably fixedly connected by a pin 72 to the stationary shaft 29. A ring 73 is rotatable on the hub 71 and is provided with a plurality of circumferentially spaced apertures 74 which respectively receive the crank pins 67 as evidenced in FIGS. 3 and 4. The apertures 74 are equally spaced-apart circumferentially and at equal radial distances from the center or axis of the hub 71 but at predetermined variable radial distances from the center of the shaft 29, as shown in FIGS. 3 and 4, whereby when the unit 31 is revolved about the axis of the shaft 29, the knives 50 will be caused to rotate about their respective axes so that they will be successively correctly positioned to cut the product 4 as it is directed to the knife assembly 3 by the conveyor means 2 in order to obtain the segments 5.

Attention is directed to the important fact that the machine, particularly the frame 1 thereof, is provided with guide means generally designated 75. More particularly, the guide means preferably includes a portion which extends angularly upwardly in order to provide a planar surface or area 76 on which the segments 5 slide. The guide means also preferably includes a guide plate 77 which has an upper planar surface 78 disposed in the same plane as the area 76 and with a cam or bevelled surface 79. The surface 79 is disposed at a slight angle to the horizontal at a predetermined location with respect to that portion of the belt 8 which engages the roller 9' and to the knives 50 of the knife assembly 3. It should be observed that the surface 79 terminates rearwardly at a high point 80 located between the axes of the shafts 18 and 29 and above the upper guide surface 78 of the plate 77. The cam surface 79 serves to guide and support the forward or leading portion of each of the slices 4 so that it will be correctly severed by one of the knives 50 substantially in the manner shown in FIG. 6. The presser shoe 24 also assists in stabilizing or holding each slice while it is being severed by a knife 50 as the latter moves downwardly in a clearance space directly in back of and below the edge 80 of the plate 77. The movement of the knife assembly 3 and the knives in the counterclockwise directions, as indicated by the arrow A in FIG. 6, is such that the segments being cut will be directed more or less downwardly for travel on the upper surface 78 of the plate and the guide surface 76 of the guide means 75.

The rotatable knife unit generally designated 6 may be designed and constructed in various ways, but as illustrated in FIGS. 6 and 7, preferably rotates in a counterclockwise direction as indicated by the arrow B and includes a shaft 81, a tubular sleeve 82 about the shaft, and a plurality of circular corresponding knives 83 having openings therein through which the sleeve extends for supporting the knives thereon. A plurality of apertured spacers or collars 84 are carried by the sleeve 82 and interposed between the knives 83 for axially spacing the same on the sleeve as shown in FIG. 7. Peripheral portions of the knives 83 are bevelled to provide sharp cutting edges.

The guide means 75, above referred to, also preferably includes a plate 85 having an upper guide surface 86 which is interrupted by a plurality of parallel slots or grooves 87 which respectively receive the sharp annular edges of the knives 83 and provide clearance so that the segments 5 will be completely severed into the cubes or pieces 7.

The frame 1 of the machine is provided with a horizontal bar 90 which carries a stripper member 91 which has inner curved portions or tongues 91' (one shown) which extend between the knives 83 and assist in releasing the cubes from between the knives so that they are free to travel through space and through a substantially tubular chute generally designated 92, as illustrated in FIG. 6. A curved guide member 92 is preferably carried by the stripper and assists in guiding the cubes or slices and/or fragments thereof into the chute.

Attention is directed to the important fact that the sliced product 4 travels on the belt portion 10 substantially in a tangential direction with respect to the roller 9' and chordally with respect to the knife assembly 3 and that the segments travel in a substantially straight downward path which is substantially tangent to the knife assembly 3 and the knife unit 6. Otherwise expressed, the guide means 75 defines a plane which is disposed in an oblique angular relationship with respect to the plane of the upper portion 10 of the conveyor means 2 and is substantially tangent to the roller 9', knife assembly 3 and knife unit 6. Of further significance is the fact that the bevelled surface 79 and edge 80 thereof of the guide plate 77 are located at a relatively high position or elevation in a predetermined relationship to the conveyor means and knife assembly 3 so as to assist, in combination with the presser shoe 24, in stabilizing the product while it is being cut by the knives 50. It should also be observed that the upper surface 10 of the conveyor means defines a plane which if extended to the right would pass between the longitudinal axes of the shafts 29 and 81 and that at least a portion of the guide means 75 is interposed between the conveyor means and knife assembly.

The foregoing factors and particularly the oblique angular relationship between the upper portion 10 of the conveyor 2 and the guide means 75 and the relationship of the latter with the knife assembly 3 and knife unit 6 affords a unique setup whereby crushing of the product during the cutting action is substantially eliminated or reduced. The high point 80 of the cam surface 79 is located at substantially at the breakoff area of the slices and due to the clearance space therebelow afforded by the incline of the guide means 75, the leading portions of the slices are successively supported but for a moment while being cut by the knives 50, thereby promoting uniformity in the size and texture of the segments 5. The guide means 75 assists in gravitational travel of the segments to the knife unit 6 for transversely cutting the segments into the cubes or pieces 7.

Any means suitable for the purpose may be utilized for driving or operating the machine but as illustrated, the electrical motor 11 is preferably utilized. This motor is operatively connected to the shaft 18 of the driven roller 9' and in driving this roller imparts motion to the belt 8 which in turn rotates the idling roller 9.

The motor 11 also serves to drive the knife assembly 3 and the knife unit 6, and as exemplified in FIG. 2, this is preferably accomplished by respectively providing the shaft 29 and 81 of the knife assembly 3 and knife unit 6 with gears 32 and 105 which mesh with the gear 14 on shaft 13 as described above. The speeds of the various movable components are synchronized whereby to promote efficient cutting of the products into the segments and cubes.

The tubular discharge chute 92, above referred to, may be designated and constructed in various ways but as depicted in FIGS. 1, 2 and 6 of the drawing is preferably generally rectangular in cross section and includes a relatively large lower tapered extremity 106 and a smaller upper extremity 107 having a bottom wall 108 provided with an upturned abutment 109 which is adapted to engage the plate 85. The inner end of the smaller extremity 107 is preferably bevelled and an upper wall 110 of the chute is provided with a fitting 111 which is fashioned to provide a hook 112 for receiving the bar 90. The chute is also provided with a handle 113 whereby to facilitate detachable connection of the chute to the bar 90 and against the plate 85.

Having thus described our invention, it is obvious that various modifications may be made in the same without departing from the spirit of the invention and, therefore, we do not wish to be understood as limiting ourselves to the exact form, construction, arrangements, and combinations of parts herein shown and described.

We claim:

1. A machine of the kind described comprising: a revolvable assembly provided with a ring of circumferentially spaced elongated movable knives rotatable about the axis of the assembly for cutting a food product into segments, a conveyor having an upper horizontal surface for feeding the product to said assembly, a rotatable unit provided with axially spaced circular knives rotatable on a horizontal axis located below the axis of said revolvable assembly for cutting the segments into pieces of substantially uniform size, and guide means disposed substantially tangent to said assembly and said unit and in an angular inclined relationship to said conveyor surface and having an upper portion disposed between said assembly and said conveyor whereby to facilitate cutting of the product for travel of the pieces downwardly on said guide means.

2. The machine defined in claim 1, in which said upper portion of said guide means is provided with a surface which is disposed at an acute angle with respect to the remainder of said guide means.

3. The machine defined in claim 1, including means whereby to assist in stabilizing the product on said upper portion of said guide means while it is being successively cut by said elongated knives.

4. The machine defined in claim 1, including a frame provided with a horizontal bar, and a chute for receiving the pieces from said rotatable unit, with means on said chute engaging said bar for supporting the chute.

5. The machine defined in claim 1, in which the plane of the upper horizontal surface of the conveyor if extended, would pass between the axes of the revolvable assembly and the rotatable unit.

6. A machine defined in claim 1, in which the knives of the revolvable assembly move at a substantial speed laterally and downwardly at the instant that the segments are cut from the product and the flat surface of the knives remain parallel with the cut surface of the product during the cutting operation.